(No Model.)

L. T. SHEFFIELD.
ARTIFICIAL TOOTH.

No. 330,431. Patented Nov. 17, 1885.

Witnesses:
Wm F. Sayers.
K. E. S. Hansmann.

Inventor:
Lucius T. Sheffield,
By Foster & Freeman
Attorneys.

UNITED STATES PATENT OFFICE.

LUCIUS T. SHEFFIELD, OF NEW YORK, N. Y.

ARTIFICIAL TOOTH.

SPECIFICATION forming part of Letters Patent No. 330,431, dated November 17, 1885.

Application filed August 12, 1884. Serial No. 140,355. (No model.)

*To all whom it may concern:*

Be it known that I, LUCIUS T. SHEFFIELD, a citizen of the United States, residing in the city, county, and State of New York, have invented certain new and useful Improvements in Artificial Teeth, of which the following is a specification.

My invention has for its object to readily connect porcelain artificial teeth to supporting bars or backings; and it consists in providing the said teeth with projecting screw-pins adapted to receive nuts, and in perforating the said support or backing to receive said pin, as fully set forth hereinafter.

Figures 1, 2, 4:
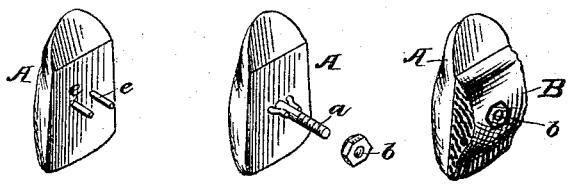
Figures 3, 6:
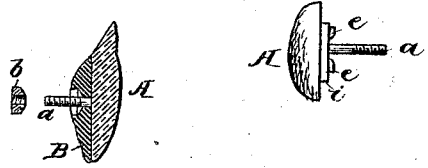
Figure 5:
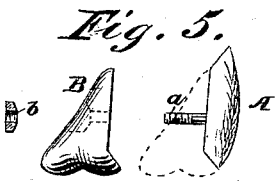

In the drawings, Figure 1 is a perspective view showing the porcelain tooth with threaded pin and nut adapted thereto. Fig. 2 shows the same connected to the backing. Fig. 3 is a transverse section of Fig. 2. Fig. 4 illustrates an ordinary porcelain tooth with platina pins. Fig. 5 shows the tooth, threaded pin and nut, and metallic backing adapted to the tooth. Fig. 6 is a view illustrating one mode of connecting the threaded pin to the tooth.

In that class of artificial dentures in which teeth are supported by bridges or bars connected immovably to supporting roots or crowns, it sometimes becomes necessary to replace a tooth, which must be done without removing the denture from the mouth, and it is also desirable in other instances to so connect the teeth to their supporting plates or backings as to permit them to be readily applied to and detached therefrom. To effect these purposes, I provide each tooth with one or more threaded pins, $a$, secured firmly to and projecting from the back of the tooth, and this pin I pass through a hole in the bridge or backing B, and then apply a nut, $b$, to the threaded pin, so as to secure the tooth firmly against the said bridge or backing.

Different modes of connecting the threaded pin to the tooth may be employed. For instance, it may be embedded in the tooth in process of manufacture; but this mode cannot be used with teeth already manufactured. I therefore in such case place the end of the pin $a$ between the ordinary platina pins, $e\ e$, projecting from the back of the ordinary tooth, A, then place the end of the pin $a$ between the pins $e$, then bend the latter against the pin $a$, as shown in Fig. 1, and then solder the pins and screw-pin together. Instead of this, the pin $a$ may be riveted to a plate, $i$, perforated to receive the pins $e$, which are bent down or clinched or riveted to the plate $i$, as shown in Fig. 6. The bridge or backing is perforated for the passage of the pin or pins $a$, and is countersunk at the rear side, so as to receive the nut $b$, thereby preventing any projection liable to injure the tongue. After the application of the nut the projecting end of the pin $a$ is cut off and burnished.

To prevent possible turning of the tooth from its proper position, the threaded pin may be squared at the point next the porcelain to fit into a square hole in the bar or bridge.

In that class of teeth provided with backings and sold in connection therewith as articles of manufacture, to be soldered or otherwise applied to the bridges of artificial dentures, the said backings are detachably connected to the teeth by means of the threaded pins $a$ and nuts $b$, adapted to perforations in the backings, as shown in Fig. 5.

I do not herein claim any features I have shown and described, and which are claimed in my application Serial No. 140,359.

Without limiting myself to the precise construction and arrangement of parts shown, I claim—

1. The combination, in an artificial denture, of a metallic support or backing, a porcelain facing-piece, a threaded pin projecting from the porcelain piece through an opening in the backing, and a nut adapted to the said pin and securing the porcelain to the backing, substantially as described.

2. An artificial tooth provided with a threaded pin, $a$, connected to the tooth through the medium of the platina pins $e$, substantially as set forth.

3. An artificial tooth-crown of porcelain, provided with a threaded pin permanently attached to it and projecting substantially at right angles from its inner surface, and with a nut adapted to fit the screw-threads, substantially as described.

In testimony whereof I have signed my name to this specification in the presence of two subscribing witnesses.

LUCIUS T. SHEFFIELD.

Witnesses:
 GEO. H. EVANS,
 F. E. FREEMAN.